(12) United States Patent
Jin et al.

(10) Patent No.: US 7,993,756 B2
(45) Date of Patent: Aug. 9, 2011

(54) LONG-CHAIN QUATERNARY AMMONIUM COMPOUNDS AS WOOD TREATMENT AGENTS

(75) Inventors: Lehong Jin, Charlotte, NC (US); Alan F. Preston, Charlotte, NC (US); Kevin J. Archer, Charlotte, NC (US); Futong Cui, Charlotte, NC (US); Andrew R. Zahora, Charlotte, NC (US); Paul J. Walcheski, Mount Ulla, NC (US)

(73) Assignee: Viance, LLC, Charlotte, NC (US)

( * ) Notice: Subject to any disclaimer, the term of this patent is extended or adjusted under 35 U.S.C. 154(b) by 0 days.

(21) Appl. No.: 11/121,632

(22) Filed: May 4, 2005

(65) Prior Publication Data
US 2006/0251915 A1 Nov. 9, 2006

(51) Int. Cl.
C09K 3/00 (2006.01)
(52) U.S. Cl. ............... 428/535; 428/536; 428/537.1; 427/298
(58) Field of Classification Search ........... 428/541, 428/535, 536, 537.1; 427/298
See application file for complete search history.

(56) References Cited

U.S. PATENT DOCUMENTS

| | | | |
|---|---|---|---|
| 4,929,454 A | 5/1990 | Findlay et al. | |
| 5,833,741 A | 11/1998 | Walker | |
| 6,274,199 B1 * | 8/2001 | Preston et al. | 427/298 |
| 6,569,540 B1 | 5/2003 | Preston et al. | |
| 6,843,837 B2 | 1/2005 | Zhang et al. | |
| 2003/0010956 A1 * | 1/2003 | Las et al. | 252/380 |

FOREIGN PATENT DOCUMENTS

| | | |
|---|---|---|
| CA | 1146704 A | 5/1983 |
| EP | 0 889 958 | 12/1985 |
| EP | 0293556 A1 | 2/1988 |
| EP | 0293246 A1 | 11/1988 |
| EP | 1114704 A1 | 7/2001 |
| EP | 1114704 A2 * | 11/2001 |
| WO | WO-82/03817 A1 | 11/1982 |
| WO | WO-96/19616 A1 | 6/1996 |
| WO | WO97/45236 * | 12/1997 |
| WO | WO-97/45236 A1 | 12/1997 |
| WO | WO-99/39886 A1 | 8/1999 |
| WO | WO-0071311 A2 | 11/2000 |
| WO | 03066294 | 8/2003 |
| WO | WO 03/066294 | 8/2003 |

OTHER PUBLICATIONS

Kirk-Othmer, "Encyclopedia of Chemical Technology", 4th Ed., vol. 10 p. 267, John Wiley & Sons, 1993.
Dunn C C, << Fungicidal Properties of Alkyl-Dimethyl-Benzyl Ammonium Chlorides >>, Proceedings of the Society for Experimental Biology and Medicine, vol. 37 pp. 661-661, 1938.
Butcher J A et al, "Initial Screening Trials of Some Quaternary Ammonium Compounds and Amine Salts as Wood Preservatives", Forest Products Journal, vol. 27 No. 7, pp. 19-22, Jul. 1977.
Butcher JA et al, "Relative Tolerance of Seven Wood-destroying Basidiomycetes to Quaternary Ammonium Compounds and Copper-chrome-arsenate Preservative", Material und Organismen, vol. 12 No. 4, pp. 271-277, 1977.
Butcher J A et al, "Potential of Unmodified and Copper-Modified Alkylammonium Compounds as Groundline Preservatives", New Zealand Journal of Forestry Science, vol. 9 No. 3, pp. 348-358, 1979.
Swedish Office action corresponding to Swedish Patent Application No. 0702536-4, dated Oct. 1, 2008, 8 pages.

* cited by examiner

*Primary Examiner* — Leszek Kiliman
(74) *Attorney, Agent, or Firm* — McAndrews, Held & Malloy, Ltd.

(57) ABSTRACT

A composition is disclosed comprising a long-chain quaternary ammonium compound and a wood preservative active agent or a mixture thereof. The long-chain quaternary ammonium compound includes at least one alkyl moiety having from 16 to 50 carbon atoms, unsubstituted or substituted with one or more N, O, S, or halogen atoms. A method of treating wood is disclosed, comprising impregnating wood with the above composition in an amount effective to reduce the preservative active ingredient loss in the treated wood or to increase the resistance of the wood to decay. Treated wood and wood products are disclosed comprising wood impregnated with the above composition, including a treatment level of the long-chain quaternary ammonium compound effective to reduce the preservative active ingredient loss in the treated wood or to increase the resistance of the wood to decay.

27 Claims, 3 Drawing Sheets

LONG-CHAIN QUATERNARY AMMONIUM COMPOUNDS AS WOOD TREATMENT AGENTS

CROSS-REFERENCE TO RELATED APPLICATIONS

None.

STATEMENT REGARDING FEDERALLY SPONSORED RESEARCH OR DEVELOPMENT

None.

BACKGROUND

This specification relates to the use of quaternary ammonium compounds containing at least one long hydrocarbon chain. The long-chain quaternary ammonium compounds can be used as additives for various wood preservatives to enhance certain properties of wood products. The long-chain quaternary ammonium compounds of the current application have little or no biocidal activity. Two benefits of the present wood preservation treatments are:
1) Reduction of the preservative loss when the treated wood is subjected to water and soil contacts, including copper based and other wood preservative systems.
2) Enhancement of the biological performance of wood preservative system.

Quaternary ammonium compounds are widely used as biocides, surfactants, fabric softeners, anti-static agents, and hair conditioners. Related to the area of wood preservation and wood protection, one of the first reports on the fungicidal properties of quaternary ammonium compounds was made by Dunn in 1938 (C. C. Dunn, Proc. Soc. Exptl. Boil. Med., 37, 661, 1938). Reports on the use of quaternary ammonium compounds as wood preservatives first appeared in the 1960s. The efficacy of quaternary ammonium compounds as wood preservatives was reported by Butcher et al. (J. A. Butcher, A. F. Preston, and J. Drysdale, 1977, For. Prod. J. 27(7), 19; J. A. Butcher, and J. Drysdale, 1977, Mat. Und Org. 12(4), 271; J. A. Butcher, A. F. Preston, and J. Drysdale, 1979, N.Z. J. For. Sci., 9(3), 348).

ACQ® wood preservative, containing alkaline copper and quaternary ammonium compounds, was patented by Findlay and Richardson in North America (Can. Patent 1,146,704, U.S. Pat. No. 4,929,454) and by Sundman in Europe (European Patent 0089958, WO82/03817). Chemical Specialties Inc., Charlotte N.C. owns the rights for the patents resulting from the European patent and WO patent application. ACQ® is a registered trademark of Domtar Inc., exclusively licensed to Chemical Specialties Inc., Charlotte N.C., for quaternary ammonium-copper wood preservatives in North America. More recently, quaternary ammonium compounds with various carboxylate anions were described in European Patent 0906177.

The biocidal activities of quaternary ammonium compounds are related to the nature and length of their alkyl chains. In particular, relatively short chain alkyl quats such as didecyldimethylammonium chloride or short chain benzyl quats have been found to provide biocidal activity, while longer chain alkyls such as hexadecyl or longer have little or no biocidal activity in such structures. The most effective and commonly used quaternary ammonium compounds for the wood preservation industry have been alkylbenzyldimethyl ammonium compounds and didecyldimethylammonium compounds.

Long-chain quaternary ammonium compounds such as ditallowdimethylammonium chloride and dihydrogenated-tallowdimethylammonium chloride have little or no biocidal activity and are mostly used as fabric softeners, anti-static agents and hair conditioners. A recent patent (European Patent 1114704) claims waterproofing properties when long chain quaternary ammonium compounds are used in combination with biocidal quaternary ammonium compounds for wood treatments. The use of quaternary ammonium compounds and silicone binders for tissue paper was also described in European Patent 0 799 350.

A solvent-free wood preservative composition containing quaternary ammonium compounds was disclosed in WO 09939886. The quaternary ammonium compounds were said to serve as a dissolving mediator for the binding agent. In EP 0 293 556, a wood-protecting agent containing a water-soluble quaternary ammonium compound was disclosed. EP 0 293 246 described a composition containing a microbiocidally active quaternary ammonium compound. Amine oxides were used in wood preservative compositions (WO 0071311). It was suggested that the amine oxides had waterproofing properties.

One of the challenges facing providers of commercial wood preservative treatments using metal-based compositions is the potential loss of the metal component(s) during the service of the treated wood. The loss of the metal(s) is expected to reduce the biological efficacy of the chemical treatments as well as causing the lost metal to enter the surrounding environment. A recent U.S. patent (U.S. Pat. No. 6,843,837B2) has claimed that copper leaching could be reduced when certain vinyl-based polymers are added to the copper amine formulations.

SUMMARY OF THE INVENTION

One aspect of the invention is a composition comprising a long-chain quaternary ammonium compound and a wood preservative active agent. The long-chain quaternary ammonium compound has formula (1):

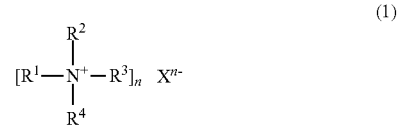

In this formula, $R^1$ and $R^2$ are the same or different alkyl moieties having 1 to 4 carbon atoms, unsubstituted or substituted with one or more N, O, S, or halogen atoms; $R^3$ is a long chain alkyl moiety having from 16 to 50 carbon atoms, unsubstituted or substituted with one or more N, O, S, or halogen atoms; $R^4$ is an alkyl, aryl, alkaryl, or aralkyl moiety having from 1 to 50 carbon atoms, unsubstituted or substituted with one or more N, O, S, or halogen atoms; X is an anion; and n is a number from 1 to 3.

Another aspect of the invention is a method of treating wood, comprising impregnating wood or wood products with the composition described above in an amount effective to increase the resistance of said wood to decay.

The present inventors have discovered an effective combination of preservative systems with non-biocidal long chain quaternary ammonium compounds to provide one or both of the following enhanced treatment properties:
1) Reduction of the preservative loss when preservative treated wood is subjected to water and soil contacts, including copper based and other wood preservative systems.
2) Enhancement of the biological performance of the copper based wood preservative system.

BRIEF DESCRIPTION OF DRAWING FIGURES

Figure 3:
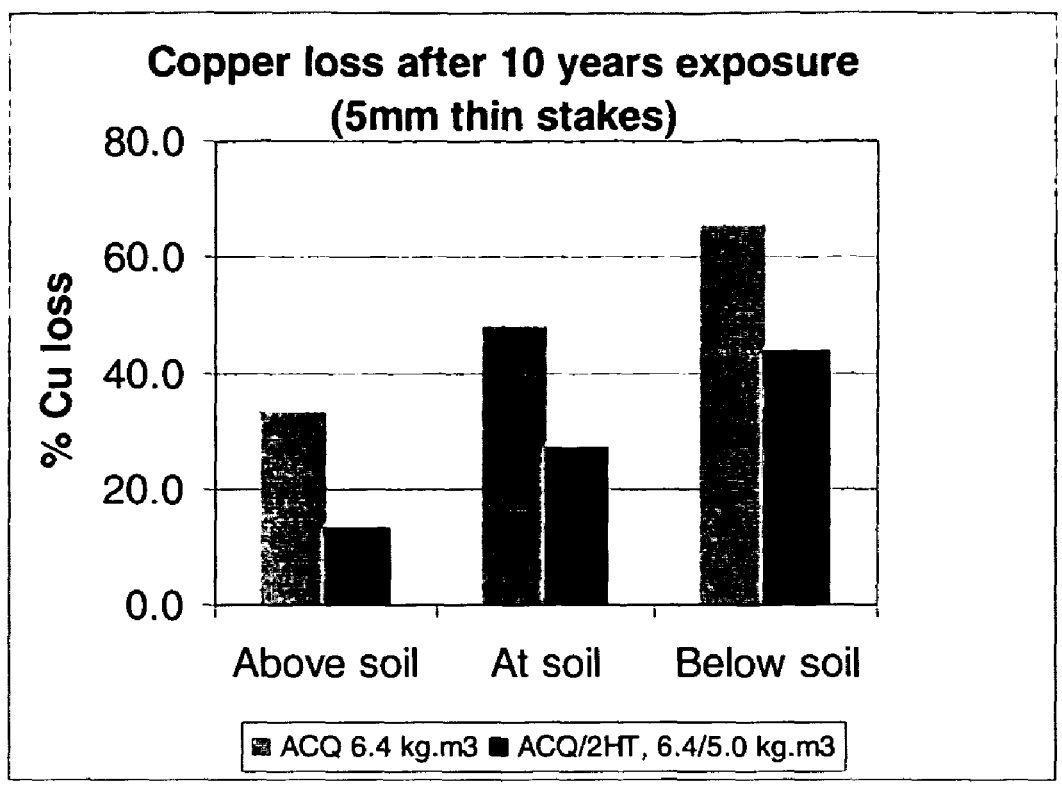

FIG. 3 presents the data from Example 3, showing the effect of 2HT on copper loss after 10 years of soil contact with treated 5-mm thin wooden stakes.

Figure 4:
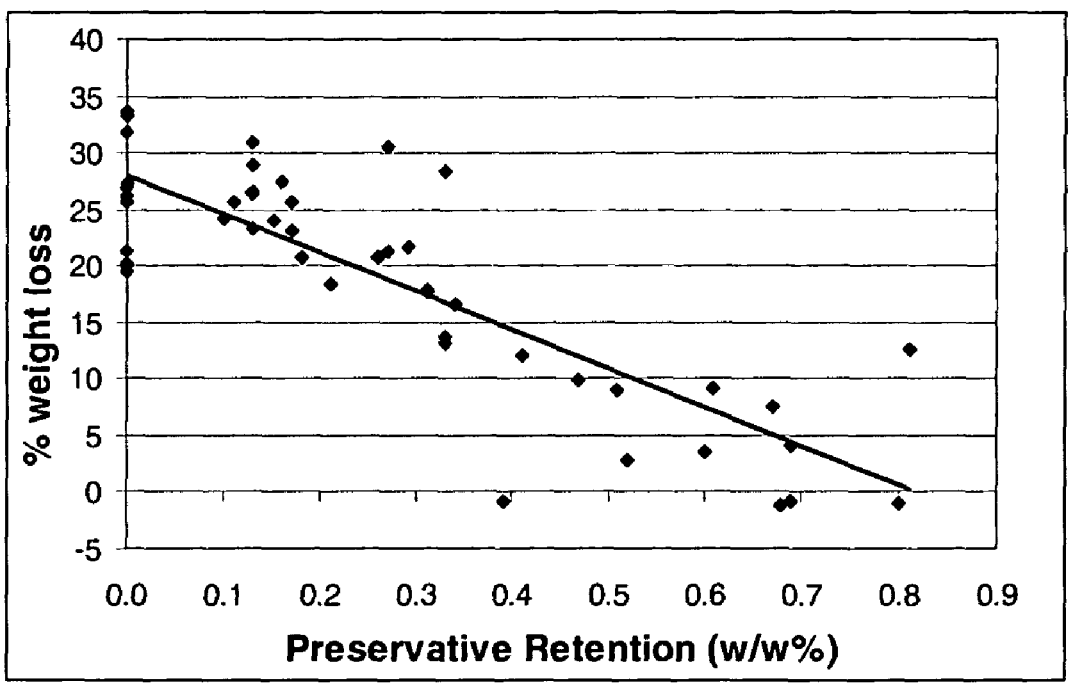

FIG. 4 shows the weight loss of 36 ACQ® wood preservative treated southern yellow pine blocks, according to the prior art, after exposure to *Postia placenta* as described in Example 4.

Figure 5:
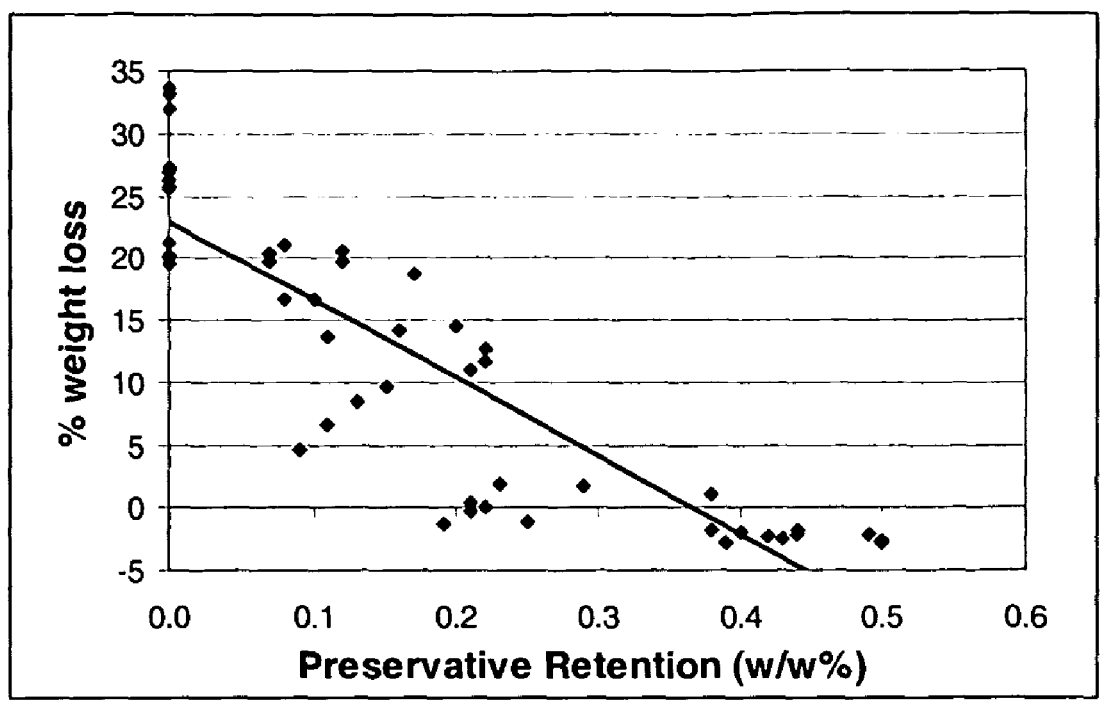

FIG. 5 is a view similar to FIG. 4, but showing the performance of a composition containing a copper wood preservative and 2HT.

DETAILED DESCRIPTION OF THE INVENTION

While the invention will be described in connection with one or more embodiments, it will be understood that the invention is not limited to those embodiments. On the contrary, the invention includes all alternatives, modifications, and equivalents as may be included within the spirit and scope of the appended claims.

The contemplated wood preservative compositions comprise a long-chain quaternary ammonium compound, having the formula set out in the Summary, and a wood preservative active agent comprising metal and/or other biocidal constituents.

The quaternary ammonium compound can also be expressed as follows for a monovalent anion X, such as chloride:

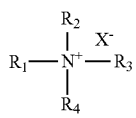

(2)

In Formula (2), $R_1$ and $R_2$ are substituted or unsubstituted hydrocarbon chains having 1-4 carbons. $R_3$ and $R_4$ are hydrocarbon chains having 1-50 carbons. When $R_3$ is a hydrocarbon chain of less than 16 carbons, $R_4$ must be a hydrocarbon chain having at least 16 carbons.

For example, according to either formula (1) or (2), $R^1$ and $R^2$ can be methyl, ethyl, or any isomer of propyl or butyl, unsubstituted or substituted with one or more N, O, S, or halogen atoms. $R^3$ can be hexadecyl, octadecyl, eicosyl, or docosyl, tallow, hydrogenated tallow, palm, rapeseed, lard, and other fatty alkyl feedstocks, unsubstituted or substituted with one or more N, O, S, or halogen atoms. Examples of such fatty acid feedstocks include fatty acids derived from any of the fats or oils listed the table in *Kirk-Othmer Encyclopedia of Chemical Technology*, 4th Ed., Vol. 10, p. 267 (John Wiley & Sons 1993). That table is hereby incorporated by reference. $R^4$ can be any one of the alkyl moieties described for $R^3$, or decyl. One example of a suitable aryl moiety $R^4$ is benzyl.

Several examples of the anion X are a halide (fluoride, chloride, bromide, or iodide); an inorganic oxo anion such as carbonate, bicarbonate, hydroxide, borate, phosphate, or sulfate; or an organic anion such as carboxylate, sulfonate, methylsulfate, or phosphonate. n is a number having an average value between 1 and 3. The value of n is dictated by the choice of an anion, as is well known in the art.

One specifically contemplated quaternary ammonium compound of this invention is a dimethyl di(hydrogenated tallow) ammonium compound, due to its low cost and commercial availability. Commercial materials of this kind are sometimes referred to as "DTDMAC" or "2HT." These are not registered trademarks. The long-chain alkyl moieties $R_3$ and $R_4$ of dimethyl di(hydrogenated tallow) ammonium compounds have a distribution of alkyl chain lengths, primarily oleyl ($C_{18}H_{38}$). The chain length of $R_3$ and $R_4$ is defined here as the weight average chain length of each. Although a proportion of individual alkyl moieties $R_3$ and $R_4$ may have less than 16 carbon atoms, if the weight average number of carbons in all the $R_3$ or $R_4$ moieties of a quaternary ammonium compound is 16 or greater, it is a long-chain alkyl moiety for the present purpose. Examples of long chain fatty acid feedstocks having an average of 16 or more carbon atoms are many of the materials listed the table in *Kirk-Othmer Encyclopedia of Chemical Technology*, 4th Ed., Vol. 10, p. 267 (John Wiley & Sons 1993). That table is hereby incorporated by reference.

Specifically contemplated anions include chloride, carbonate, bicarbonate, acetate, hydroxide, methylsulfate or a carboxylate.

DTDMAC is commercially available from Akzo Nobel under the trade name Arquad® 2HT. Other suitable trade materials include:

Arquad 2T
Arquad M2HTB
Arquad HTL8
Arquad M2HTB
Ethoquad 18/25
Ethoquad O/12
Noxamium S11M
Querton 442
Tomah Q-18-15
Ammonyx 856
Ammonyx KP
Ammonyx 4
Aliquat H226
Aliquat 264 and combinations of any two or more of these.

Long chain quaternary ammonium compounds such as 2HT have low water solubility at ambient temperatures. At ambient or lower than ambient temperatures, 2HT and water mixtures exist as a gel or paste. The viscosity of 2HT/water binary systems can be adjusted by changing the anion. When heated to 40-100° C., 2HT exists as a transparent solution in water or aqueous preservative solutions. Although soluble in water or aqueous preservative solutions at elevated temperatures, 2HT appears to be well fixed in wood substrates. It is believed that 2HT is fixed inside wood structures through physical absorption, precipitation, chemical, and physico-chemical interactions.

The present compositions further include a wood preservative agent. The wood preservative agent can be, for example, an organic or inorganic fungicide, insecticide, or other biocide composition.

The present wood preservatives may include a metal constituent, generally in the form of a complex, compound, or cation. Some specific metal constituents contemplated here are copper, zinc, chromium, silver, cobalt, aluminum, iron, lead, tin, cadmium, nickel, arsenic, and boron. Arsenic and boron are defined here as "metallic" for the present purpose, although chemically they are generally regarded as semimetallic. Arsenic is a less-preferred metal due to its regulatory status, although it is functional in the present invention. Of these, copper is the most commonly used metal in wood preservatives, and is specifically contemplated here.

The present formulations are contemplated to work with any metal constituent based wood preservatives as well as other wood preservative systems, such as (but not limited to) those defined in American Wood-Preservers' Association (AWPA) Standards P5-04 and P8-04.

Representative preservatives contemplated here include, among others:
  alkaline copper quat, for example,
    alkaline copper quat Type C (a relevant commercial example of which is ACQ®-Type C wood preservative, available from Chemical Specialties Inc., Charlotte, N.C.),
  amine copper quat, for example,
    amine copper quat Type D (a relevant commercial example of which is ACQ®-Type D wood preservative, available from Chemical Specialties Inc., Charlotte, N.C.),
  ammoniacal copper arsenate (ACA),
  ammoniacal copper carboxylate,
  ammoniacal copper citrate (CC),
  ammoniacal copper quat, for example,
    ammoniacal copper quat Type A (a relevant commercial example of which is ACQ®-Type A wood preservative, available from Chemical Specialties Inc., Charlotte, N.C.),
    ammoniacal copper quat Type B (a relevant commercial example of which is ACQ®-Type B wood preservative, available from Chemical Specialties Inc., Charlotte, N.C.),
  ammoniacal copper zinc arsenate (ACZA),
  acid copper chromate (ACC),
  chromated copper arsenate (CCA), for example,
    chromated copper arsenate Type A,
    chromated copper arsenate Type B,
    chromated copper arsenate Type C,
  chromated zinc chloride (CZC),
  copper bis (dimethyldithiocarbamate) (CDDC),
  Copper HDO (Bis-(N-cyclohexyldiazeniumdioxy)-copper (CX Type A)
  copper azole, for example,
    copper boron azole-Type A (CBA-A, also known as copper azole-Type A or CA-A),
    copper azole-Type B (CA-B),
  inorganic boron, for example,
    Borate oxide (SBX),
    $B_2O_3$ (borax).
    Zinc borate (ZB)
  Copper naphthenate
  Oxine copper
  Alkyl ammonium compounds (AAC), such as dimethyl didecyl ammonium chloride (DDAC) and alkylbenzyldimethyl ammonium chloride (BAC)
  4,5 dichloro-2-N-octyl-4-isothiazolin-3-one (DCOI)
  3-iodo-2-propynyl butyl carbamate (IPBC)
  Chlorothalonil (CTL)
  Tebuconazole (TEB)
  Propiconazole (PPZ)
  Hexaconazole, Cyproconazole and Dinaconazole
  Chlorpyrifos (CPF)
  Imidacloprid
  Pentachlorophenol
  And any combination of two or more of these.

Any suitable proportion of the long-chain quaternary ammonium component and an active preservative component or combination of the components can be used. Those skilled in the art who are aware of the present invention can readily optimize the relative amount of each ingredient for a given application. Some specifically contemplated proportions by weight of the active quaternary ammonium compound in a complete preservative formulation, as specified by the AWPA, are from 0.1 to 10 wt %, optionally from 0.3 to 5 wt %, optionally about 0.8 wt % of the composition. A suitable proportion of the wood preservative system should be based on the intended application and the concentrations based on the chemical retentions designated for such applications An "effective amount" of the long-chain quaternary ammonium component in wood to reduce decay, in the context of the present compositions (also including a wood preservative active agent), is defined as the lowest amount of the long-chain quaternary ammonium component that reduces the decay of the wood over a relevant time interval (i.e. at least long enough to cause the wood to decay to a measurable degree in the tested environment), compared to the decay of wood containing the same proportion of a wood preservative active agent, in the tested environment, in the absence of the long-chain quaternary ammonium component. For example, Table 4 discussed below in connection with Example 3 shows that a 9-month test under the stated conditions is more than sufficient to measurably decay wood, and is thus a relevant test period. In the 9-month test of Table 4, the addition of 0.8% 2HT long-chain quaternary ammonium component to the ACQ® wood preservative active agent formulation reduced decay by raising the test result (for which 100 is no decay and zero is failure due to decay) from 98.8 to 100. 0.8% 2HT is thus an effective amount of the long-chain quaternary ammonium component. (A smaller proportion of 2HT might also be effective, although this test result does not quantify what is the minimum effective proportion of 2HT.)

An "effective amount" of the long-chain quaternary ammonium component in wood to reduce the preservative active ingredient loss in the treated wood, in the context of the present compositions, is defined as the lowest amount of the long-chain quaternary ammonium component that reduces the preservative active ingredient loss, compared to the active ingredient loss from wood containing the same proportion of the wood preservative active agent, in the absence of the long-chain quaternary ammonium component.

Other additives, such as coloring agents, water repellents, fire retardants and others may also be added to the wood preservative compositions.

The present wood preservative formulations can be applied to wood using any of the treatment methods known to the art. Those conventional treatments methods are vacuum pressure treatment, double vacuum treatments, dip-treatments, spray treatment (See U.S. Pat. No. 6,569,540, assigned to the present assignee) and in-line addition treatments. The wood preservative system also can be applied as a single composition, in successive treatments (two-step treatment process) or and as a step for pre- or post treatment. Heating the treatment solution will make some long-chain quaternary ammonium compounds, such as 2HT, more soluble in the solution, which is desirable. "Solution" as defined herein includes a true solution, and also a suspension.

A preservative is usually applied to a substrate in a quantity sufficient to produce a desired preservative end point and thus, actual quantities may vary broadly. In general, an effective preservative treating solution will contain from about 0.1% to about 15% by weight of preservative active ingredients such as metal salts, organic compounds. The desired level of preservative retention will likewise depend on the biological hazards the final applications will be subjected to and the effectiveness of the preservative chemicals. Other factors such as method of application, geographic location, species of wood, etc. also play a role in determine the required chemical retentions.

However, it is generally recommended that retention be maintained from between about 0.01 to 7 lbs. of preservative active ingredients per cubic foot of wood (pcf) (0.3 to 112 $Kg/m^3$). Alternatively, this range will be from about 0.01 to about 5 pcf (0.3 to 80 $Kg/m^3$). Alternatively, this range will be from about 0.01 to about 0.6 pcf (0.3 to 9.6 $Kg/m^3$). Alternatively, this range will be from about 0.01 to about 2.5 pcf (0.3 to 40 $Kg/m^3$), alternatively from about 0.01 to about 0.4 pcf (0.3 to 6.4 $Kg/m^3$).

This invention can be applied to solid wood products such as lumber, timber and other common commodities. Also, the treatment can be used for engineered wood products such as plywood, oriented strand board (OSB), particle board, fiber boards, and other wood products.

EXAMPLE 1.

The effect of long chain quaternary ammonium compounds, using 2HT as an example, on preservative loss from wood preservative system treated wood surface when in contact with water is demonstrated. Southern yellow pine boards measuring 89 ×39×305 mm are treated with ACQ®-C2 (a component of ACQ® wood preservative containing cupric-monoethanolamine complex solution) with or without 2HT at different concentrations. After proper drying, the boards are subjected to an artificial rainfall over a period of 10 days with a total rainfall equivalent of 20 inches (508 mm). The water run-off from each board is collected separately and the copper concentration analyzed by ICP. Copper loss is expressed as micrograms of copper per square centimeter of wood surface per inch of rainfall ($\mu g/cm^2$/inch), or as a percentage of total copper loading in the treated wood. The results are shown in Table 1 and FIGS. 1 and 2.

TABLE 1

| Treatment | μg/cm2 copper loss/inch rain | | | | | | | | | |
|---|---|---|---|---|---|---|---|---|---|---|
| (CuO/2HT, kg/m3) | 1.0 | 2.0 | 3.0 | 4.0 | 5.0 | 6.0 | 7.0 | 8.0 | 9.0 | 10.0 |
| ACQ-C2, 1.7 kg/m3 | 1.907 | 1.419 | 1.119 | 0.640 | 0.672 | 0.695 | 0.358 | 0.460 | 0.293 | 0.053 |
| ACQ-C2, 2.7 kg/m3 | 3.396 | 2.838 | 2.090 | 1.456 | 1.661 | 1.347 | 0.991 | 0.783 | 0.509 | 0.300 |
| ACQ-C2, 4.3 kg/m3 | 4.321 | 4.740 | 3.933 | 2.573 | 2.403 | 2.039 | 1.478 | 1.245 | 1.342 | 0.805 |
| ACQ-C2/2HT, 1.7/5.0 kg/m3 | 0.792 | 0.450 | 0.470 | −0.136 | 0.194 | 0.217 | 0.117 | 0.223 | 0.122 | −0.154 |
| ACQ-C2/2HT, 2.7/5.0 kg/m3 | 0.828 | 0.758 | 0.613 | 0.120 | 0.402 | 0.220 | 0.168 | 0.147 | 0.141 | −0.094 |
| ACQ-C2/2HT, 4.3/5.0 kg/m3 | 2.061 | 1.183 | 0.954 | 0.393 | 0.537 | 0.612 | 0.342 | 0.287 | 0.616 | −0.017 |

Figure 1:
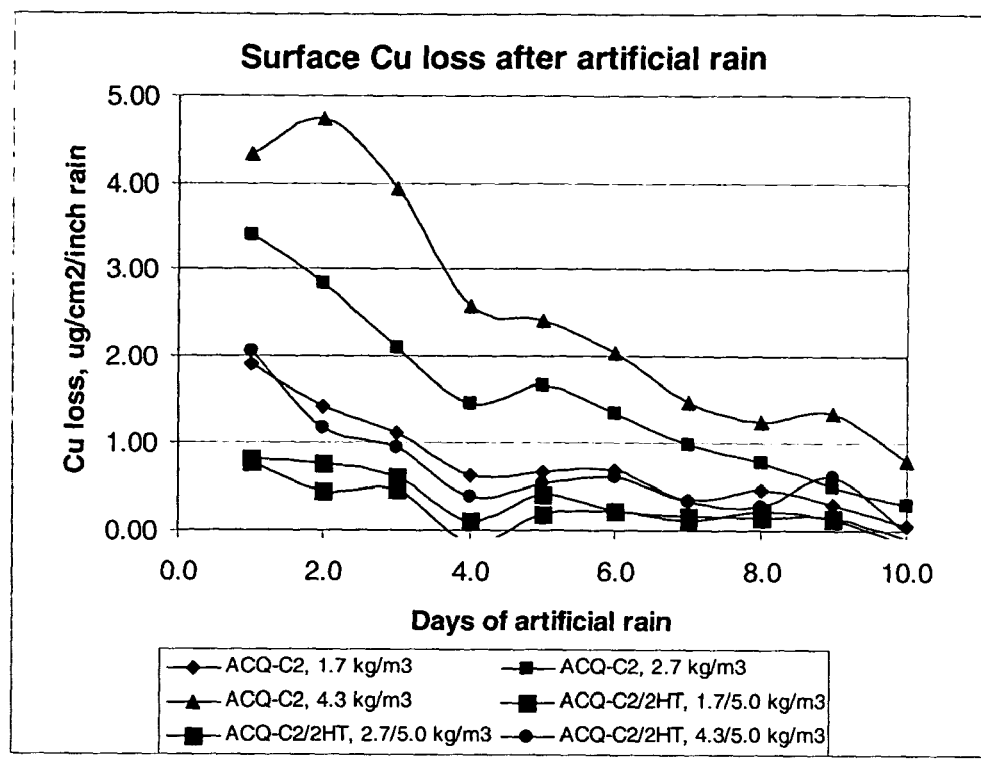
FIG. 1 shows data from Example 1 demonstrating the effect of a long-chain quaternary ammonium compound, 2HT, on the reduction of copper loss from preserved wood samples during a series of artificial rainfalls.

In FIG. 1 the plots, from bottom (1, least copper loss) to top (6, most copper loss), are ordered along most of their lengths as follows:
1 ACQ-C2/2HT, 1.7/5.0 $kg/m^3$;
2 ACQ-C2/2HT, 2.7/5.0 $kg/m^3$;
3 ACQ-C2/2HT, 4.3/5.0 $kg/m^3$;
4 ACQ-C2, 1.7 $kg/m^3$;
5 ACQ-C2, 2.7 $kg/m^3$;
6 ACQ-C2, 4.3 $kg/m^3$;

The data, particularly plots 1 versus 4, 2 versus 5, and 3 versus 6, indicates that copper loss per inch of rain is reduced significantly due to the presence of long chain quaternary ammonium compounds, in this case 2HT. The data also indicates the expected result that more copper is lost for a higher initial copper treatment level.

Figure 2:
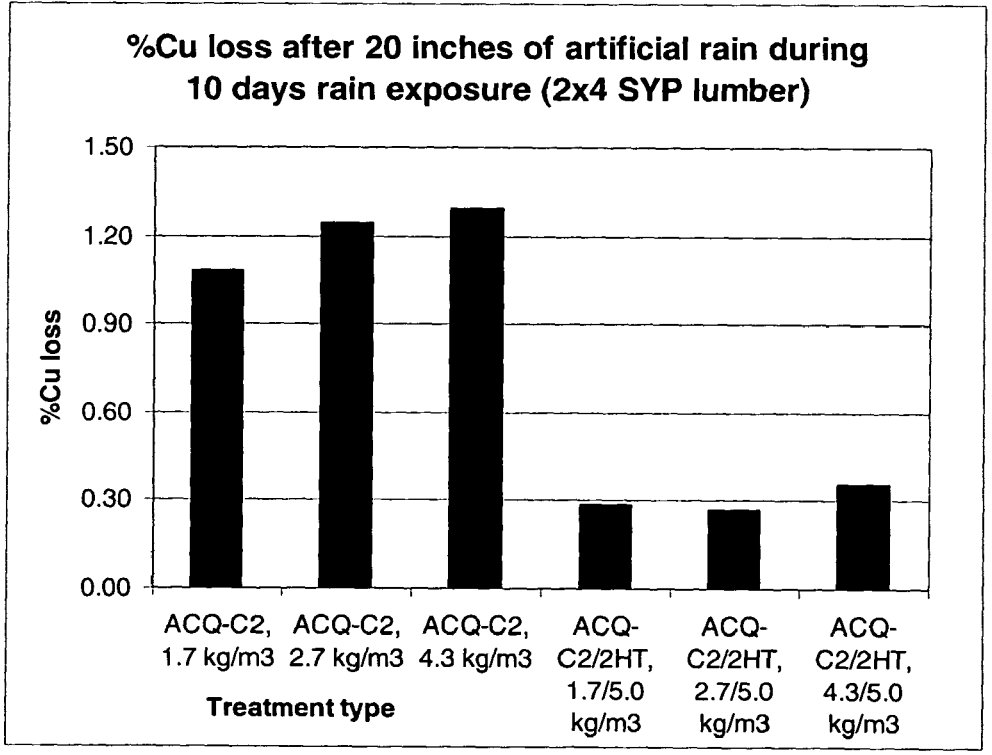
FIG. 2 shows data from Example 1 in which the copper loss from ten rainfalls is combined and expressed as a percentage of total copper loading.

FIG. 2 shows the results of the same test after 20 inches of artificial rain over a period of 10 days, expressed as total copper loss over the period. The data bars, from left (1) to right (6), are results for:
1 ACQ-C2, 1.7 $kg/m^3$;
2 ACQ-C2, 2.7 $kg/m^3$;
3 ACQ-C2, 4.3 $kg/m^3$;
4 ACQ-C2/2HT, 1.7/5.0 $kg/m^3$;
5 ACQ-C2/2HT, 2.7/5.0 $kg/M^3$;
6 ACQ-C2/2HT, 4.3/5.0 $kg/m^3$;
The data for FIG. 2 is provided in Table 2

TABLE 2

| Treatment (CuO/2HT, kg/m3) | % Cu loss |
|---|---|
| ACQ-C2, 1.7 kg/m3 | 1.08 |
| ACQ-C2, 2.7 kg/m3 | 1.24 |
| ACQ-C2, 4.3 kg/m3 | 1.29 |
| ACQ-C2/2HT, 1.7/5.0 kg/m3 | 0.28 |
| ACQ-C2/2HT, 2.7/5.0 kg/m3 | 0.27 |
| ACQ-C2/2HT, 4.3/5.0 kg/m3 | 0.36 |

Again, the data of FIG. 2, particularly bars 1 versus 4, 2 versus 5, and 3 versus 6, indicates that the total percent copper loss is reduced more than 75% due to the presence of long chain quaternary ammonium compounds, in this case 2HT. The data also indicates that a higher level of copper treatment resulted in a less than proportional copper loss.

EXAMPLE 2.

An accelerated green house soil-bed decay test (AWPA Standard Test Method E14), shows that 2HT can significantly reduce biocide leaching, in this case the copper as well as biocidal quaternary ammonium compounds. Selected stakes are analyzed for active preservative ingredients after 10 years of exposure in the soil contact test. 2HT is shown to be able to reduce the leaching of both the copper and quaternary ammonium components of the ACQ® wood preservative. In soil-contact portions of the stake, copper loss from ACQ®/2HT wood preservative treated stakes is 33% lower than stakes treated with ACQ® wood preservative alone. Above the soil line (non soil-contact portion), copper loss is reduced by more than 50% due to the presence of 2HT (FIG. 3). The data for FIG. 3 is provided in Table 3.

TABLE 3

| | Average % Cu depleted | | |
|---|---|---|---|
| | Above soil | At soil | Below soil |
| ACQ 6.4 kg · m3 | 33.1 | 47.9 | 65.5 |
| ACQ/2HT, 6.4/5.0 kg · m3 | 13.2 | 27.0 | 43.8 |

The reduction of preservative loss could lead to longer service life of the treated wood product and provide potential environmental benefits during storage and in service of preservative treated wood products.

EXAMPLE 3.

The same accelerated green house soil-bed decay test (AWPA Standard Test Method E14) shown above also demonstrates that 2HT can also enhance the efficacy of the copper based wood preservative systems, in this case the ACQ® wood preservative. In this example, the addition of 0.8% 2HT improves the performance of ACQ® wood preservative at all three retention levels tested after about 10 years field exposure. The results are shown in Table 4.

TABLE 4

Accelerated Soil-bed Decay Test of Southern Pine Mini-Stakes* (Harrisburg NC)

| Treatment Type | Level (kg/m3) | Measurement time (months after beginning of test) | | | | | | |
|---|---|---|---|---|---|---|---|---|
| | | 9 mo. | 34 mo. | 50 mo. | 63 mo. | 77 mo. | 92 mo. | 108 mo. | 119 mo. |
| ACQ ® wood preservative | 2 | 98.8 | 81.0 | 62.9 | 0.0 | 0.0 | 0.0 | 0.0 | 0.0 |
| | 4 | 100.0 | 98.9 | 85.9 | 55.0 | 31.0 | 4.0 | 0.0 | 0.0 |
| | 6.4 | 100.0 | 100.0 | 98.6 | 89.0 | 76.5 | 23.0 | 0.0 | 0.0 |
| ACQ ® wood preservative + 0.8% 2HT | 2 | 100.0 | 94.2 | 81.9 | 47.0 | 30.0 | 16.0 | 0.0 | 0.0 |
| | 4 | 99.9 | 99.7 | 97.5 | 92.0 | 83.0 | 66.0 | 61.4 | 22.9 |
| | 6.4 | 100.0 | 100.0 | 98.9 | 98.0 | 93.5 | 86.0 | 82.9 | 71.4 |
| Untreated | 0 | 54.0 | 27.5 | 0.0 | 0.0 | 0.0 | 0.0 | 0.0 | 0.0 |

A decay rating of 100 means no decay, and a rating of 0 indicates failure due to decay. Though other factors may play a role, it is believed that the reduction of preservative depletion by 2HT may be partially responsible for the observed enhancement of preservative efficacy.

EXAMPLE 4.

The preservative efficacy enhancement properties of 2HT are also demonstrated in a standard soil-block decay test (AWPA Standard Test Method E-10). FIG. 4 shows the weight loss of 36 ACQ® wood preservative treated southern yellow pine blocks, according to the prior art, after exposure to *Postia placenta*. The vertical axis is percent weight loss of the wood blocks (negative numbers represent weight gain), and the horizontal axis is ACQ® wood preservative retention in the wood blocks expressed on a weight preservative/weight wood basis.

FIG. 5 is a view similar to FIG. 4, showing the weight loss of 36 ACQ®/2HT treated southern yellow pine blocks (according to the present invention) after exposure to *Postia placenta*. The toxic threshold of ACQ® wood preservative against *Postia placenta* is estimated to be 0.7-0.8% in this test (FIG. 4). The same toxic threshold for ACQ®/2HT wood preservative is estimated to be 0.3-0.4% (FIG. 5). These results suggest that 2HT at 0.8% in the treating solution could almost double the toxicity of ACQ® wood preservative toward the test fungus *Postia placenta*, which is a typical copper tolerant fungus used in wood preservation research.

What is claimed is:

1. A composition comprising:
A. a long-chain quaternary ammonium compound having the formula:

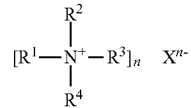

wherein:
$R^1$ and $R^2$ are the same or different alkyl moieties having 1 to 4 carbon atoms;
$R^3$ is a long chain alkyl moiety having from 16 to 50 carbon atoms;
$R^4$ is a long chain alkyl moiety having from 16 to 50 carbon atoms;
X is an anion; and
n is a number from 1 to 3; and
B. a metal constituent based wood preservative.

2. The composition of claim 1, wherein the anion comprises a halide, an inorganic oxo anion, an organic anion, or a combination thereof.

3. The composition of claim 1, wherein the anion comprises chloride, carbonate, bicarbonate, hydroxide or a combination thereof.

4. The composition of claim 1, wherein $R^1$ and $R^2$ are methyl.

5. The composition of claim 1, wherein $R^3$ is an alkyl moiety having from 16 to 22 carbon atoms.

6. The composition of claim 1, wherein $R^3$ is a tallow alkyl moiety.

7. The composition of claim 6, wherein $R^4$ is a tallow alkyl moiety.

8. The composition of claim 6, wherein $R^3$ is a hydrogenated tallow alkyl moiety.

9. The composition of claim 1, wherein the long-chain quaternary ammonium compound comprises dimethyldi(hydrogenated tallow)ammonium chloride.

10. The composition of claim 1, wherein the wood preservative active agent is a metal constituent comprising copper.

11. The composition of claim 1, wherein the wood preservative active agent is a metal constituent comprising copper, zinc, chromium, silver, cobalt, aluminum, iron, lead, tin, cadmium, nickel or a combination of two or more of these.

12. The composition of claim 1, wherein the wood preservative active agent comprises a cupric-monoethanolamine complex solution.

13. The composition of claim 1, wherein the composition comprises an amine copper-long-chain quaternary ammonium wood preservative.

14. The composition of claim 1, comprising an alkaline copper-long-chain quaternary ammonium wood preservative.

15. The composition of claim 1, wherein the long-chain quaternary ammonium compound is present at a concentration of from 0.1 to 10% by weight.

16. The composition of claim 1, wherein the long-chain quaternary ammonium compound is present at a concentration of from 0.3 to 5% by weight.

17. The composition of claim 1, wherein the long-chain quaternary ammonium compound is present at 0.8% by weight.

18. The composition of claim 1, wherein the wood preservative active agent is present at a concentration effective to preserve wood contacted with the composition.

19. The composition of claim 1, wherein the wood preservative active agent is present at a concentration of from 0.02 to 10% by weight.

20. The composition of claim 1, wherein the wood preservative active agent is present at a concentration of from 0.02 to 5% by weight.

21. The composition of claim 1, wherein the wood preservative active agent is present at a concentration of from 0.02 to 2% by weight.

22. The composition of claim 1, wherein the wood preservative active agent further comprises a biocidal quaternary ammonium compound having the formula:

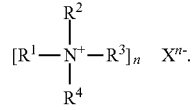

where:
R$^1$ and R$^2$ are the same or different alkyl moieties having an average of from 1 to 3 carbon atoms;
R$^3$ is a short or medium chain saturated or mono-, di-, or poly-unsaturated alkyl moiety having a weight average of from 8 to 14 carbon atoms;
R$^4$ is an alkyl group having an average of 8 to 12 carbon atoms, an aryl group, an aryl substituted lower alkyl group, where the lower alkyl group has 1-3 carbon atoms, or a combination of these, provided that if R$^3$ has an average of more than 12 carbon atoms, R$^4$ is an aryl group, an aryl substituted alkyl group, or a combination of these,
X is an anion; and
n is a number having an average value between 1 and 3.

23. The composition of claim 22, wherein the biocidal quaternary ammonium compound comprises alkylbenzyldimethyl ammonium chloride, didecyldimethyl ammonium chloride, didecyldimethyl ammonium carbonate, didecyldimethyl ammonium bicarbonate, or a combination of two or more of these.

24. The composition of claim 23, wherein the biocidal quaternary ammonium compound comprises didecyldimethyl ammonium carbonate, didecyldimethyl ammonium bicarbonate, or a combination of these.

25. A method of treating wood, comprising impregnating wood with the composition of claim 1 in an amount effective to increase the resistance of the wood to decay.

26. Treated wood comprising wood impregnated with the composition of claim 1, including a treatment level of the long-chain quaternary ammonium compound effective to increase the resistance to the loss of the active ingredients in the preservative system.

27. Treated wood comprising wood impregnated with the composition of claim 1, including a treatment level of the long-chain quaternary ammonium compound effective to increase the resistance of the wood to decay.

* * * * *